Aug. 6, 1935.  E. A. KELLY  2,010,724
COUPON BOOK
Filed July 18, 1928
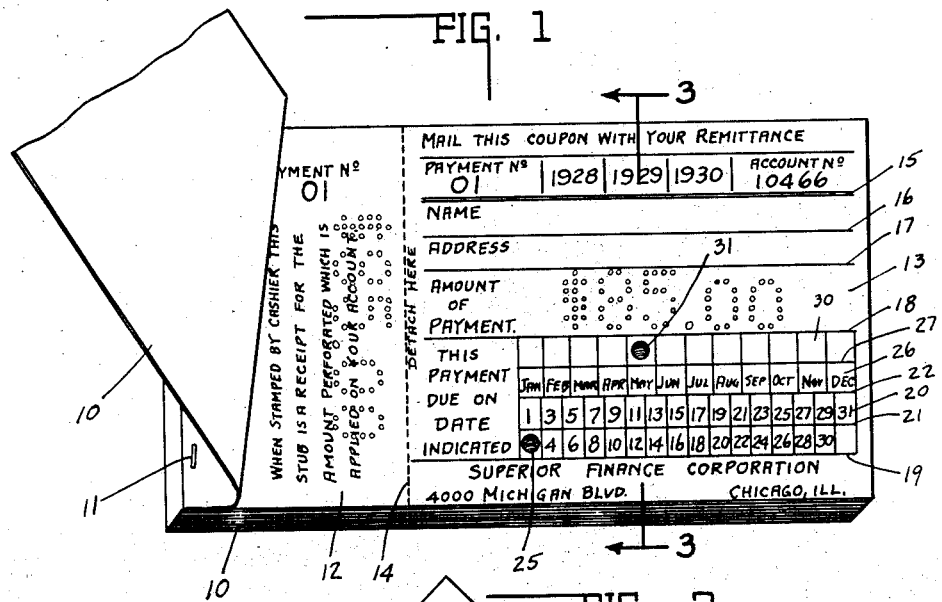
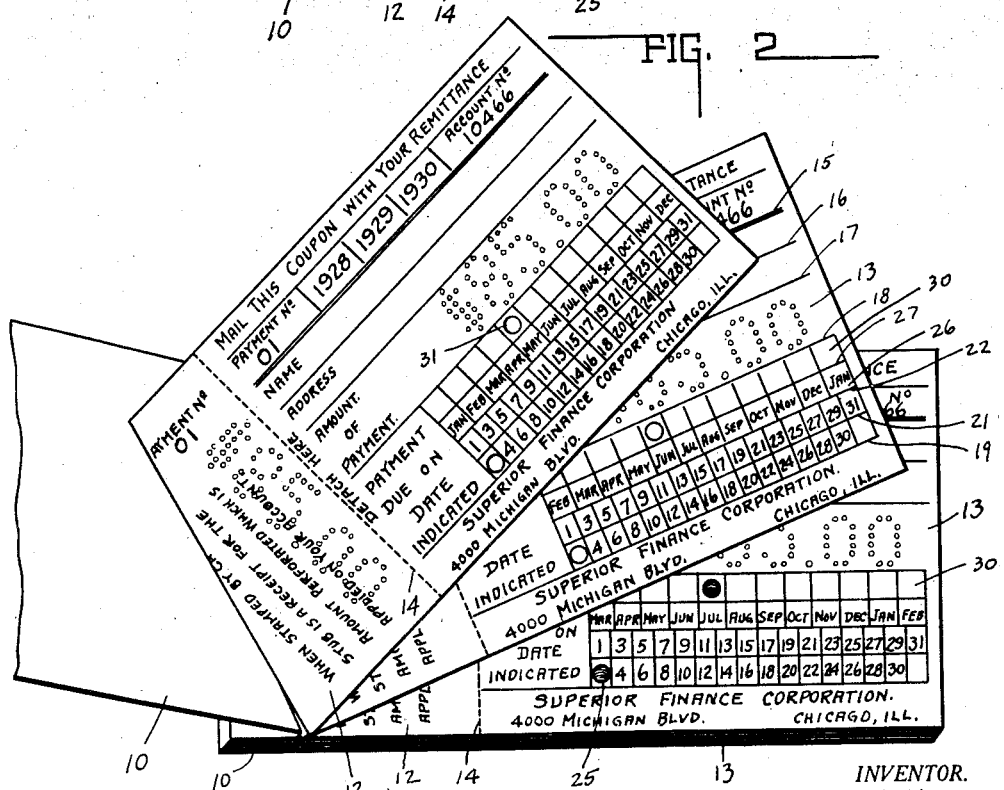
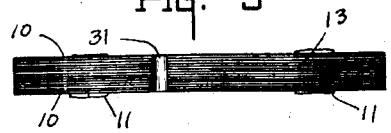
INVENTOR.
EDWARD A. KELLY,
ATTORNEYS.

Patented Aug. 6, 1935

2,010,724

UNITED STATES PATENT OFFICE 2,010,724

COUPON BOOK

Edward A. Kelly, Indianapolis, Ind., assignor to Allison Coupon Company, Indianapolis, Ind., a corporation Application July 18, 1928, Serial No. 293,694

2 Claims. (Cl. 283—66)

This invention is preferably a collection coupon book, and the chief object of the invention is to facilitate the preparation and use of coupon books for collecting similar amounts due on the same day of a series of months or on the same day and month for a series of years.

The invention is chiefly for use by installment payment concerns, automobile underwriters, banks and concerns handling subscriptions and the like. These concerns prepare a coupon book in which the name and address of the payer is usually written and the times for payment printed and the time for the payment of each installment indicated by punching the day on the coupon when the installment is due. These coupon books have one coupon or sheef for each installment and often there are a considerable number of coupons in each book and relating to one transaction. Instead of the labor necessary to write on each coupon the exact time when it is due, this invention contemplates that the dates be printed so that they can be punched for indicating the date when each coupon is due.

The chief novel feature of the invention is arranging the dates on the coupons so that one punch will indicate the months when the payment is due on all coupons in the book, and also one punch will indicate the day of the month when the payment is due on all coupons in the book. Therefore, instead of writing out the month and day on all the coupons when the payment is due, that can all be indicated merely by two punch marks. The invention applies whether the due dates of the payments are expressed in days and months as usual, or in days, months and years. Therefore, by this means, a single punch will indicate successive months and also variable periods of time, as required in the above transactions.

The full nature of the invention will be understood from the accompanying drawing and the following description and claims:

In the drawing, Fig. 1 is a perspective view of said new coupon book with the cover sheet turned back. Fig. 2 is a similar view with the cover sheet and the first two coupons turned back. Fig. 3 is a section on the line 3—3 of Fig. 1.

In the drawing there is shown a coupon book consisting of a plurality of superimposed sheets secured together within paper covers 10 by brads 11. Each sheet consists of a stub 12 and a coupon 13 with a dotted score line 14, as has long been common in the construction of coupon books. The stub can have printed on it any desired matter relating to the book and coupons.

The coupons 13 are superimposed upon each other and are similar in dimensions and substantially in the printed matter thereon. There is one coupon for each payment or installment to become due. In the case of sales of automobiles, for which this coupon particularly has been designed and used, there are usually twelve or fifteen monthly payments to be provided for and, therefore, the coupon book contains twelve or fifteen coupons. Each coupon has spaced provided by lines 15, 16 and 17 for indicating the name and address of the person who has purchased the automobile and who is obligated to make the payments set forth on the coupons. Also a space is provided between lines 17 and 18 for indicating the amount of each installment or payment to be made. In what is here shown said amount is $85.00 and it is preferably indicated by a check punch or protector. Below the line 19 there is indicated the name and address of the company to whom the payments are to be made. Between lines 18 and 19 at the inner end of the coupon there is a space with lettering indicating "this payment due on date indicated", and the indications of the date on which the payments are due constitute the novel feature of this invention.

There is printed on each coupon a series of day numbers 20, said numbers being from "1" to "31" in numerical order and in the coupons here shown in two rows between lines 19, 21 and 22, although the number of rows or the particular relation of the day numerals is more or less immaterial, so far as they appear on each coupon. But it is important that these day numerals be similarly arranged on all the coupons and in exact superimposed positions, so that in a coupon book the numerals "5" on all the coupons will be exactly in a vertical row or superimposed on each other. This enables the day on which each payment is due to be quickly indicated by a single punch forming the punched hole 25. In the drawing the second day of the month has been punched, which means that the installments are all due on the second day of the month, as it punches the "2" in said set of day numerals in every coupon with one operation of the punch.

A row of month abbreviations 26, for a calendar year, is located preferably adjacent the day numerals 20 and between the lines 22 and 27 are formed twelve squares in which the month abbreviations are printed. Adjacent the row of month abbreviations 26 there is a row of punch squares 30 registering therewith, and in the first coupon there is a punched hole 31 above the month of "May", which indicates that the first coupon is due on the second day of May.

The month abbreviations on the coupons are staggered with relation to each other by being shifted on each coupon one month to the right hand on the superimposed coupon. Thus the first coupon shows "May" punched, while the second coupon shows "Jun" under May, and the third coupon shows "Jul" under May on the first coupon. On each succeeding coupon the month abbreviations are advanced one month so that the month abbreviations on the series of coupons that are located under "May" on the first coupon are "Jun", "Jul", "Aug", and so on, running clear through to April, abbreviating them. Thus the punched hole 31, as shown in Fig. 3, extends entirely through the whole series of coupons 13 and through the successive month abbreviations throughout the whole period involved. Thus after the first coupon has been paid, the book will show that the next payment is to be on June 2nd. The third coupon shows that the payment is due on July 2nd, and so on.

By the foregoing arrangement a single punch of the coupons indicates the month in which every payment of every coupon is due, and one punch through the coupons indicates the day of the month on which each payment becomes due. This greatly facilitates the filling in of the coupon blanks. Instead of the months and days being written out by longhand or a typewriter, the months and days for all the coupons are indicated by two operations. Since the number of days in the various months varies some having 28, 29, 30 and 31 days it is not seen that in this coupon book as required for said transactions for which it is adapted, a single punch of the sheets will indicate successive months and also variable periods of time.

If the coupon book should be desired to cover a period of years, the year payments could be added and punched in the same manner and on the same principle as the months are printed and punched. In other words, the invention is not limited to exactly the periods of time shown, but may be extended to any desired time periods. This greatly reduces the labor of making coupon books and enables one person to prepare the coupon books for a very large number of transactions as compared with the old practice of filling in all the blanks by writing the same. When a payment is made, the payer tears out the coupon to be paid at the time and mails it with his remittance or brings it with him to the office where the same is to be paid.

An important advantage of the invention is that there is a definite relation between the consecutive arrangement of the superposed payment numbers and the due dates of the respective coupons, as established by the chronologically arranged superposed month indicia. For instance, assume that the coupons are issued to cover a total payment of $600.00 in twelve equal payments of $50.00 each, and that five payments have been made. The coupon bearing the number "6" would then be the topmost coupon of the book, because the preceding coupons would have been removed. Thus, at a glance the information is conveyed that five payments of $50.00 each have been made, totaling $250.00, and that seven payments of $50.00 remain unpaid, totaling $350.00. Therefore, there is always a definite consecutive record of the amount paid and the amount due on any date indicated by the topmost coupon of any group, or any integrated date of other coupons of each group, and the date on which the next payment is due.

The invention claimed is:

1. A multiple payment coupon book comprising a set of coupons consisting of a predetermined number of coupons arranged in superposed relation, each coupon of the set bearing a space which registers with a correspondingly positioned numbered space on each of the other superposed coupons, the respective spaces carrying payment number indicia, with the numbers running continuously with respect to each other through all of the superposed coupons, each coupon of the set having time indicia thereon at predetermined positions, said time indicia continuously denoting the months of the calendar year with respect to each other, with the month indicia on each coupon of the set registering with correspondingly located month indicia on all of the other superposed coupons of the set, but with the respective indicia offset with respect to each other in such manner that all registering month indicia are arranged continuously with respect to each other, from the top to the bottom of the superposed coupons, each coupon of the set also containing predeterminedly positioned indicia continuously denoting with respect to each other the days of the month in register with similar continuously denoted day indicia on the other coupons of the set while in superposed relation, the coupons of the set and the respective registering indicia thereon being so constructed and arranged that a punch mark through any set of registering month indicia of the superposed coupons combined with a punch mark through any registering day indicia of the superposed coupons will establish the due date of each payment number of the respective superposed coupons in continuous order and thereby disclose the number of future payments to be made and the number of payments that have been made, on any date indicated by the punch mark and upon all of the superposed coupons.

2. A multiple payment coupon book comprising a set of coupons consisting of a predetermined number of coupons superposed one upon the other, each coupon of the set having thereon an identifying number, said identifying numbers being arranged in such manner as to provide a series of registering numbers which are continuous with respect to each other from the top to the bottom of the superposed coupons of said set, each coupon of the set also containing indicia at predetermined positions thereon denoting a plurality of fixed intervals of time in such manner that said denoted intervals of time on each coupon are in register with correspondingly positioned denoted intervals of time on the other coupons of the set while the coupons are in superposed relation, the denoted intervals of time of each coupon being the same as those of the other superposed coupons of the set, but offset with respect thereto in such manner that all registering denoted intervals of time of the coupons are arranged continuously with respect to each other from the top to the bottom of the superposed coupons, said set of coupons with their respective identifying numbers and time intervals indicia being arranged in such manner that while the coupons of the set or any unremoved portion thereof are in superposed relation, the total amount paid as represented by the number of coupons previously removed is obvious from an inspection of the topmost coupon, and the total balance due as represented by the remaining unremoved superposed coupons on the date is also obvious from an inspection of the topmost coupon of the set, or any integrated date of the other superposed coupons of said group, and said topmost coupon also indicates the date upon which the next payment is due.

EDWARD A. KELLY.